March 5, 1968 N. SULLIVAN 3,371,528
TAKE-OFF DIRECTOR

Filed May 17, 1965 3 Sheets-Sheet 1

INVENTOR.
NEIL SULLIVAN
BY
ATTORNEY.

March 5, 1968      N. SULLIVAN      3,371,528
TAKE-OFF DIRECTOR

Filed May 17, 1965      3 Sheets-Sheet 2

INVENTOR.
NEIL SULLIVAN
BY
S.C. Seaton
ATTORNEY

March 5, 1968  N. SULLIVAN  3,371,528
TAKE-OFF DIRECTOR
Filed May 17, 1965  3 Sheets-Sheet 3
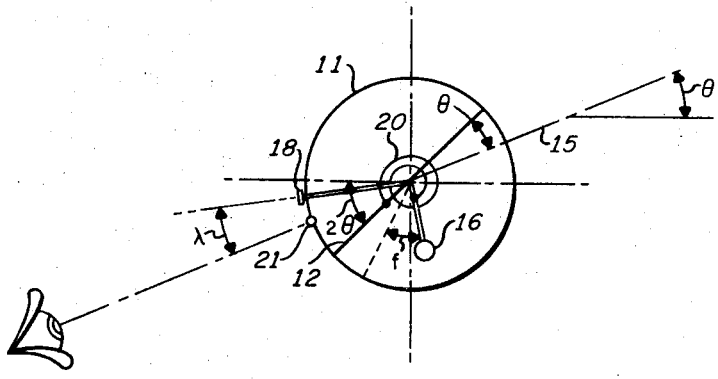
FIG. 4.
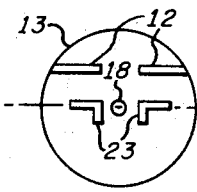 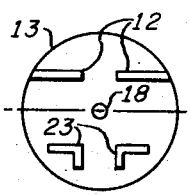 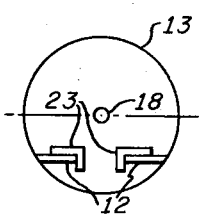
FIG. 7A.  FIG. 7B.  FIG. 7C.
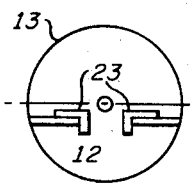 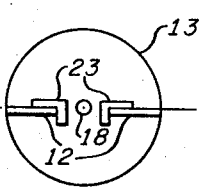
FIG. 7D.  FIG. 7E.
INVENTOR.
NEIL SULLIVAN
BY
*S.C.Seaton*
ATTORNEY United States Patent Office 3,371,528
Patented Mar. 5, 1968

3,371,528
TAKE-OFF DIRECTOR
Neil Sullivan, Sunbury-on-Thames, England, assignor, by mesne assignments, to Sperry Rand Limited, London, England, a company of England
Filed May 17, 1965, Ser. No. 456,223
Claims priority, application Great Britain, May 19, 1964, 20,559/64
2 Claims. (Cl. 73—178)

ABSTRACT OF THE DISCLOSURE

The longitudinal-axis acceleration of an aircraft existing at rotational velocity ($V_R$) is employed to command a pitch attitude proportional thereto whereby the longitudinal-axis acceleration then obtaining is converted into vertical lift resulting in a pitch attitude that is optimum for the climb-out velocity ($V_2$).

This invention relates to an aircraft flight instrument for use by a pilot during longitudinal acceleration of the aircraft.

Take-off procedure normally comprises an initial speed-gathering ground run, followed by rotation (i.e. pitching up) of the aircraft, lifting the nose to increase the angle of incidence of the wings which leads to actual take-off when the lift thereby generated is great enough; and finally the climb-out. The degree of rotation of the aircraft is governed or controlled by the pilot, and if too great may lead to the aircraft stalling on take-off. This invention is concerned with giving an indication to the pilot of a safe pitch rate related to the aircraft acceleration.

The invention provides an aircraft flight instrument having means for indicating the deviation from a predetermined optimum relationship between the acceleration taken along a longitudinal axis of an aircraft and the pitch attitude taken as the inclination of said axis to the horizon, whereby a null reading of the indicating means defines a desired accelerating/climbing flight path.

In a preferred arrangement the pitch attitude is taken from a remote vertical gyro, and the forward acceleration is measured by a linear accelerometer, and the departure from the optimum relationship is displayed on a flight director type instrument.

Figure 1:
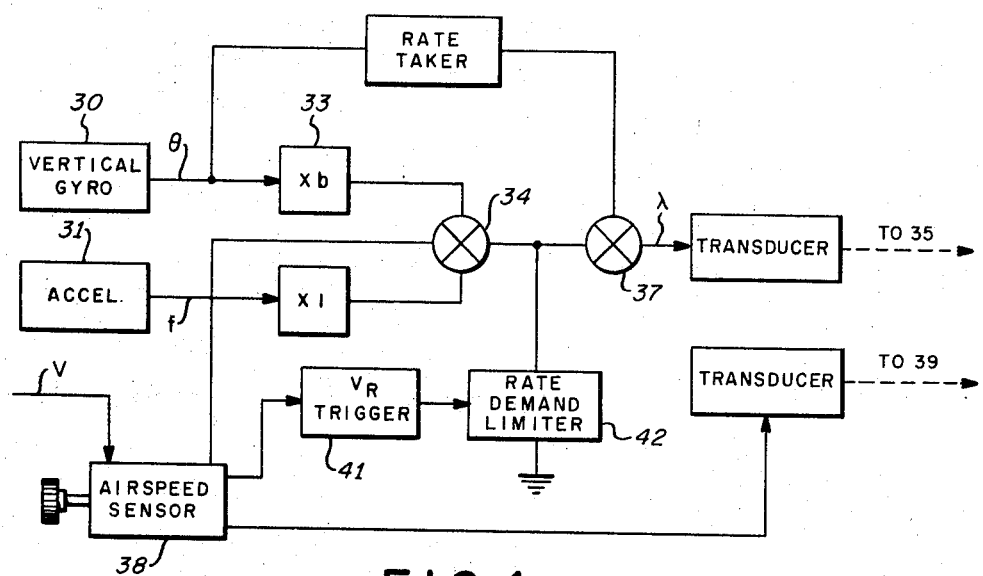
Figure 2:
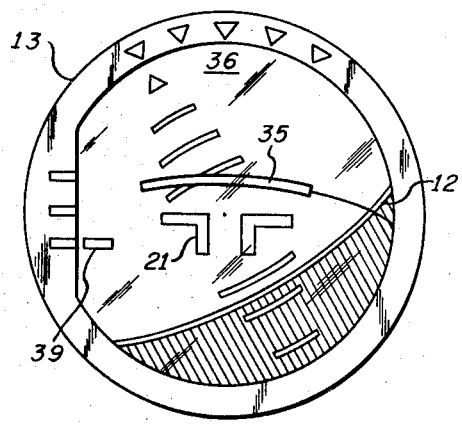
Figure 3:
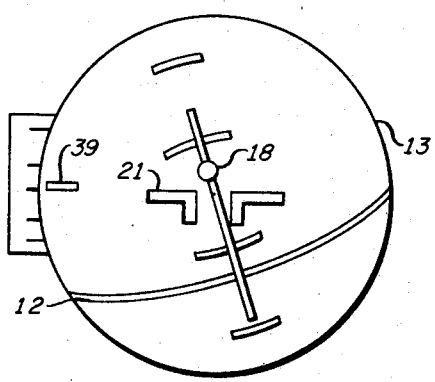
Figure 5:
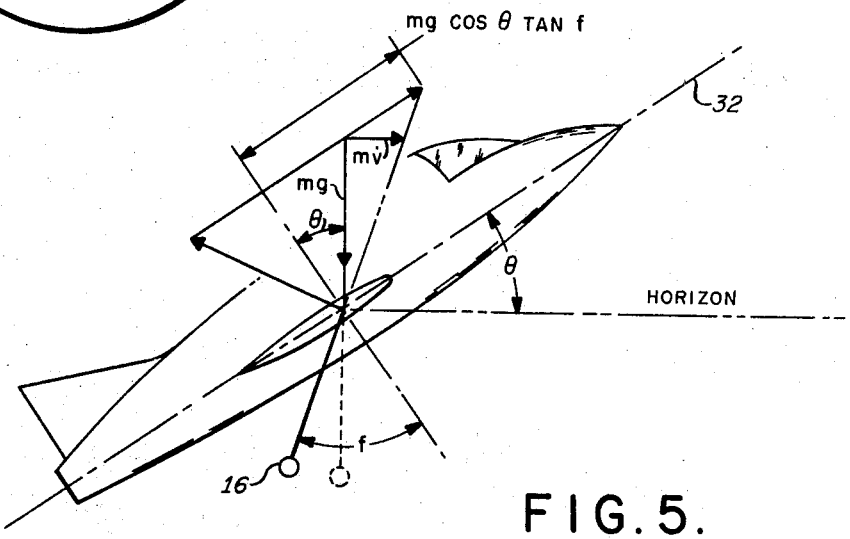
Figure 6:
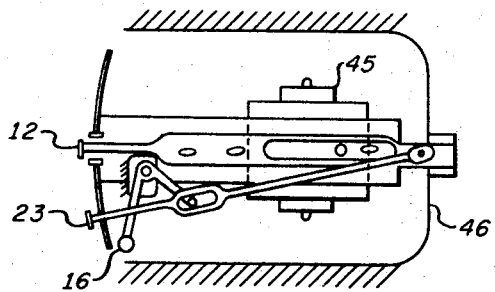

A number of embodiments of the invention are shown in the accompanying drawings, in which:

FIGURE 1 is a schematic block diagram of the schematic arrangement of a flight director comprising a first embodiment of the invention, FIGURE 2 shows the face of a flight director instrument suitable for use in the arrangement of FIGURE 1, FIGURE 3 shows the face of a second embodiment of self-contained instrument embodying the invention, FIGURE 4 is a diagrammatic side view of a portion of the instrument of FIGURE 3, FIGURE 5 is a diagram indicating more clearly the angles and axes referred to in connection with all of the embodiments, FIGURE 6 is a view of part of the mechanism of a third embodiment of the invention, and FIGURES 7A–7E are diagrams showing the embodiment of FIG. 6 under various flight conditions.

In the take-off director instrument of FIGURES 1 and 2, a vertical gyro 30 and a linear accelerator 31 mounted in the aircraft to measure acceleration along the longitudinal axis 32 (FIGURE 5) of the aircraft, supply separate signals $\theta$, representing the airframe pitch attitude angle in radians, and $f$, representing the acceleration as a fraction of the acceleration due to gravity, respectively.

The pitch signal $\theta$ is multiplied by a constant $b$ in multiplier 33, and the signals are algebraically summed at 34. The resultant signal $\lambda$ is then applied to position a pitch director index 35 on the face 36 of the instrument 13. The flight director instrument may be of the type disclosed in U.S. Patent 2,782,395.

The pilot flies the aircraft so as to maintain index 35 aligned with the fixed aeroplane symbol or reference index 21 on the instrument face, and in doing so maintains $\lambda=0$, i.e. $f=b\theta$, which is the chosen optimum relationship. Any resultant $\lambda$ error represents the deviation from the optimum relationship.

The instrument system shown in FIGS. 1 and 2 also algebraically adds at 37 a function of the rate of change of pitch, so as to reduce any tendency to overshoot the demanded optimum pitch angle, i.e. a pitch damping term.

$V_R$ trigger 41 and rate demand limiter 42 operate to prevent application of the $\lambda$ error signal to the index 35 until the rotation speed $V_R$ is reached, and thereafter to limit the $\lambda$ signal at a level at which the rate at which the aircraft must be pitched up so as to maintain the index 35 aligned with the aeroplane symbol 21, is a predetermined maximum safe value.

The value of the factor $b$, is dependent on the characteristics of the aircraft on which the take-off director is installed, but typically has a value between 1.3 and 1.7 for the climb/acceleration case. If loss of thrust leads to a diving condition "$b$" automatically changes to approximately 0.9 by the action of a semiconductor in the electrical network.

It is the purpose of the instrument shown in FIGURES 3 and 4 to derive and display the error quantity $\lambda$ above in a self-contained manner without reference to additional external sources of information. The pitch attitude angle $\theta$ is taken from an external remote vertical gyro (not shown). A spherical surface 11 having horizon lines 12 is pivoted so that the horizon lines may move vertically relative to case 13, the position of the horizon line being controlled by relative movement between the stationary gyro and the instrument case 13 which moves with the aircraft. The horizon line 15 is usually arranged so that it would be horizontal if the aircraft were flying level with its wings at the normal cruising angle of incidence. This attitude (trim attitude) is taken for convenience as the zero or datum from which the angle $\theta$ is measured, and is marked by the fixed symbol 21. As indicated in FIGURE 4, the horizon lines are geared to be rotated through an angle $2\theta$ on a relative rotation of $\theta$ between the gyro and the case (i.e. a pitch attitude angle of $\theta$). Other datum lines could, of course, be used.

The forward acceleration is measured by using a pendulum bob weight 16 of mass $mg$. At constant forward speed the bob weight tends to hang vertically downwards for all aircraft attitudes (as shown in dotted lines in FIGURE 5), but on experiencing forward acceleration it will tend to be forced back from the vertical by an angle equal to $$\tan^{-1}\frac{\dot{v}}{g}$$

where $v$ is the horizontal component of velocity. The angle $f$ (FIGURE 5) at which the bob weight hangs relative to the longitudinal axis 32 of the aircraft is therefore equal to $$\theta + \tan^{-1}\frac{\dot{v}}{g}$$

FIGURE 5 shows a vector diagram of the forces acting on the bob weight, from which it will be seen that the total accelerating force resolved along the longitudinal axis 32 is $mg \cos\theta \tan f$.

In the specific arrangement of FIGURES 3 and 4, the measurements of acceleration and pitch attitude angle are combined to be indicated by a single pointer 18, which is rigidly fixed at 90° to the pendulum bob 16 to move with the bob. When the aircraft has a pitch attitude angle $\theta=0$ (i.e. the axis 32 is horizontal), and has no acceleration, horizon lines 12 and indicator pointer 18 would coincide on the centre line 15, the bob weight hanging vertically. When the aircraft pitch attitude angle increases, the horizon lines 12 tilt downward as shown. Two hairsprings 20 are each attached at one end to move with the spherical surface 11, and at the other end to the pendulum bob, so that on downward tilting of the horizon lines the bob is pulled out of the vertical so that the pointer 18 would appear below the aeroplane symbol. On acceleration of the aircraft the bob 16 would move back from this position by an angle proportional to $\dot{v}/g$ as described above, and the pointer 18 would appear to move upward to take up a position as shown at angle $\lambda$ above the aeroplane symbol.

Inspection of the forces acting on the bob when both of the above effects take place simultaneously shows that, for small angles, $\lambda = f - b\theta$ where $b$ is determined by the spring rate.

In using either of the instruments of FIGS. 1 and 2 or FIGS. 3 and 4 the pilot manoeuvres the aircraft in pitch adjusting his elevators in such a way as to hold the error signal $\lambda = 0$. Thus with the instruments of FIGURES 1 and 2, and 3 and 4, when the flight director index tends to rise the pilot pulls back the control column so as to make the aircraft (and therefore the fixed aircraft symbol on the instrument) pitch upwards, thus tending to restore the error index towards its zero position. By virtue of the relationship $$f = b\theta \left( \text{or } \frac{\dot{v}}{g} = (b-1)\theta \right)$$

being maintained; the value of $b$ being greater than 1, it is established that the net forward thrust along the airframe longitudinal axis always exceeds the opposing component of gravity, thereby ensuring that there is always positive rate of change of velocity. If the available thrust is reduced for any reason, the error signal $\lambda$ calls for a reduction in airframe attitude, $\theta$, to restore the situation. The detection of loss of thrust and the display of the required corrected pitch command is substantially instantaneous and does not depend on the build up of any secondary error such as the loss of airspeed.

In some emergencies, the reduction of power may be so great that the aircraft decelerates so much that the angle $f$ itself becomes negative. Under these circumstances the value of $b$ is changed to a figure between 0.9 and 1 to avoid further loss of speed in the resulting directed dive. In the case of the self-contained instrument by an arrangement of double hairsprings with a fixed stop (not shown) to restrain one of them from applying any further force to the pendulum bob when the latter has passed a chosen point may be provided.

The form of instrument illustrated in FIGURES 6 and 7 is a self-contained take-off director for small aircraft, or a standby instrument for larger commercial aircraft. This instrument is intended for use as an Artificial Horizon and has a conventional horizon bar 12 mechanically positioned by a vertical gyro 45 within the instrument case 46.

An aeroplane datum symbol 23 (which in prior instruments has been fixed or manually settable) is pivoted to move up-and-down across the face of the instrument, independently of the position of the horizon bar 12. A pendulum bob 16 (FIGURE 6) moving in response to forward acceleration as described before, controls the movement of the aeroplane symbol 23 through a pivoted linkage so that the symbol 23 moves downward from the centre point for increase in acceleration, and upward for deceleration. Different springs govern the upward and downward movements of index 23 giving different relationships between $\theta$ and acceleration corresponding to the different values of $b$ as described before.

The pilot using this instrument aims to bring the horizon bar 12 and index 23 into coincidence throughout rotation and climb out, and FIGURES 7A to 7E show the relative instrument positions during the take-off. FIGURE 7A shows the aircraft stationary on the ground with little or no angle of incidence and no acceleration. During the ground run the horizon lines are stationary, and the index 23 drops with increase in acceleration as shown in FIGURE 7B.

When the pilot commences rotation, the aircraft nose rises, and the horizon bar drops as shown in FIGURE 7C. So long as the pilot maintains the aircraft's pitch attitude so that the horizon bar is coincident with index 23, the desired proportion of rate of climb to acceleration is correct. Shortly after take-off the engine power is normally decreased so the index 23 rises but still shows some apparent acceleration. To avoid stalling, the rate of climb (pitch attitude) must be similarly decreased, so that the horizon lines remain coincident with index 23 as seen in FIGURE 7D. After the climb-out is finished, the pilot levels the aircraft as seen from FIGURE 7E.

It will be necessary to preset the instrument for the particular aircraft installation to give the required relationship between acceleration and attitude.

When fitted as a standby instrument in a large aircraft which normally uses a more complex take-off director, during a correct take-off, the index 23 will remain at all times aligned with the horizon bar, so that the instrument is ready for instant reference should the normal instrument fail.

The instruments so far described can suffer from inaccuracies attributed principally to the possibility that the gyroscope may have erected to a false vertical due to the accelerations inherent in the take-off manoeuvre. The effect of such an error is to bias the acceleration datum by an amount $g\delta\theta$ which can be considerable if $\delta\theta$ exceeds the fraction of 1°. In order to contain this error, a direct measure of V (velocity along the flight path) compared with some desired velocity i.e. $V_2$ or climbout velocity, may be introduced. In the case of the flight director instrument shown in FIGURES 1 and 2, this control term is shown derived from an airspeed unit 38 and included in the $\lambda$ signal in summing device 34 via lead 49. In the case of the self-contained instrument shown in FIGURES 3 and 4 airspeed error may be shown either on a separate pointer of the same instrument (FIGURE 3) or by reference to a conventional airspeed indicator.

For use during the speed gaining run on the ground the instruments may have an airspeed pointer shown at 39 in FIGURES 1, 2 and 3 indicating on a speed scale the "rotation speed" $V_R$ at which rotation should normally be commenced. As measured with a conventional air data sensor, this signal can be expected to be unsteady and subject to excessive random gust variations.

A signal which may be derived from the airframe-mounted longitudinal accelerometer and the vertical gyro in such a way that the resultant represents only acceleration along the runway (i.e. it has no attitude component) and this signal may be used to provide intertial velocity smoothing. In some embodiments this signal can be the deviation signal $\lambda$ itself if the constant "$b$" in the optimum relation is changed to unity by the attitude of the aircraft, since in any take-off run the attitude of the aircraft is usually substantially more nose down than that at which the constant "$b$" changes from unity to its upper value. The raw air data airspeed signal is therefore smoothed heavily (with a time constant of about 5 seconds) and the resulting deficient in response is made up by a correspondingly smoothed version of the forward inertial acceleration.

The relative proportions of these two signals may be so chosen that the combined signal represents instantaneous velocity.

Thus, for example, $$\frac{V}{1+5s} + \frac{5.sV}{1+5s} = V \cdot \frac{(1+5s)}{(1+5s)} = V$$

Alternatively the inertial contribution to the velocity signal, i.e. increased acceleration content, may be enhanced so as to anticipate the safety (stall) speed $V_s$ by an amount proportional to the available acceleration, thus deriving $V_R$ automatically. When smoothed in this way, the combined airspeed signal is suitable for giving a precise indication of rotation speed.

Such a signal may be applied to the main pitch director index (35 in FIGURE 2), during the speed-gathering run. This index then shows full "fly down" when the airspeed along the runway is substantially below $V_R$, returning to zero as $V_R$ is reached. At this point the pitch-up demand is allowed to operate the index and is limited so as to be satisfied by a chosen rate of pitch (typically 2 to 3° per second).

What is claimed is:

1. Take-off apparatus for aircraft comprising an indicator having first and second relatively movable pointers, a vertical gyroscope for providing a measure of the pitch attitude of the aircraft, acceleration responsive means comprising a plumb-bob for providing a measure of the acceleration of said aircraft along its fore and aft axis, and means responsive to said measures for moving one of said pointers by movement of said gyroscope and for moving the other of said pointers in accordance with the movement of said plumb-bob whereby to produce a pitch attitude of the craft proportional to its longitudinal acceleration when said craft is controlled to maintain the relative displacement therebetween zero.

2. The apparatus as set forth in claim 1 further including spring means coupled between said pointers for urging the same into coincidence.

References Cited
UNITED STATES PATENTS

| | | | |
|---|---|---|---|
| 1,706,201 | 3/1929 | Drexler | 33—304.1 |
| 1,713,930 | 5/1929 | Sperry | 33—204.1 |
| 1,812,503 | 6/1930 | Titterington | 33—204.1 |
| 2,669,786 | 2/1954 | Lynch | 33—204.2 |
| 3,077,109 | 2/1963 | Gold | 73—178 |
| 3,148,540 | 9/1964 | Gold | 73—178 |
| 3,241,362 | 3/1966 | Scott | 73—178 |
| 3,262,311 | 7/1966 | Gwathmey | 73—178 |
| 3,295,369 | 1/1967 | Priestley | 73—178 |
| 3,309,923 | 3/1967 | Bishop et al. | 73—178 |

LOUIS R. PRINCE, *Primary Examiner.*

N. B. SIEGEL, *Assistant Examiner.*